United States Patent
Cole et al.

(10) Patent No.: US 9,767,150 B2
(45) Date of Patent: *Sep. 19, 2017

(54) SYSTEM AND METHOD FOR PROCESSING DATABASE QUERIES

(71) Applicant: ParAccel, Inc., Campbell, CA (US)

(72) Inventors: Richard L. Cole, Los Gatos, CA (US); Yijou Chen, Cupertino, CA (US); William J. McKenna, Oceanside, CA (US); Sergei Perfilov, Sunnyvale, CA (US); Aman Sinha, San Jose, CA (US); Eugene Szedenits, Jr., Ypsilanti, MI (US)

(73) Assignee: ParAccel, Inc., Cupertino, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/947,086

(22) Filed: Jul. 21, 2013

(65) Prior Publication Data

US 2014/0089291 A1    Mar. 27, 2014

Related U.S. Application Data

(63) Continuation of application No. 13/546,989, filed on Jul. 11, 2012, now Pat. No. 8,510,291, which is a continuation of application No. 12/757,639, filed on Apr. 9, 2010, now Pat. No. 8,244,715.

(60) Provisional application No. 61/168,197, filed on Apr. 9, 2009.

(51) Int. Cl.
*G06F 17/30* (2006.01)
*G06F 7/00* (2006.01)

(52) U.S. Cl.
CPC .............................. *G06F 17/30466* (2013.01)

(58) Field of Classification Search
CPC ................................................. G06F 17/30466
See application file for complete search history.

(56) References Cited

U.S. PATENT DOCUMENTS

| | | | |
|---|---|---|---|
| 5,345,585 A | 9/1994 | Iyer et al. | |
| 5,671,403 A | 9/1997 | Shekita et al. | |
| 5,848,406 A * | 12/1998 | Mani | G06F 17/30392 707/2 |
| 6,138,111 A | 10/2000 | Krishna | |
| 7,076,477 B2 | 7/2006 | Lin et al. | |
| 7,356,526 B2 | 4/2008 | Gao et al. | |
| 7,941,426 B2 | 5/2011 | Bestgen et al. | |
| 2005/0138047 A1 | 6/2005 | Liu et al. | |

OTHER PUBLICATIONS

Fegaras, L., "A New Heuristic for Optimizing Large Queries," Proceedings of the Database and Expert Systems Applications, 9th International Conference, DEXA '98, 1998, pp. 726-735, Vienna, Austria.

(Continued)

*Primary Examiner* — Marc Somers
(74) *Attorney, Agent, or Firm* — Fenwick & West LLP (57) ABSTRACT

A system and/or method are implemented to process queries to a database. In particular, the processing of queries to the database is enhanced by enhancing the determination of join orders of tables implicated in queries. Join orders between relatively large numbers of tables are determined by dividing the set of tables to be ordered into a plurality of subsets of tables, and ordering the individual subsets of tables.

26 Claims, 3 Drawing Sheets

(56) References Cited

OTHER PUBLICATIONS

Guttoski, P. et al., "Kruskal's Algorithm for Query Tree Optimization," Proceedings of Ideas 2007, 11th International Database Engineering and Applications Symposium, 2007, Alberta, Canada, seven pages.
Kossmann, D. et al., "Iterative Dynamic Programming: A New Class of Query Optimization Algorithms," ACM Transactions on Database Systems, Mar. 2000, pp. 43-82, vol. 25, No. 1.
Krishnamurthy, R. et al., "Optimization of Nonrecursive Queries," Proceedings of the 12th International Conference on Very Large Data Bases, Aug. 1986, pp. 128-137, Kyoto, Japan.
Swami, A., "Optimization of Large Join Queries: Combining Heuristics and Combinatorial Techniques," Association of Computer Machinery, 1989, pp. 367-376.
Tao, Y. et al., "Optimizing Large Star-Schema Queries with Snowflakes via Heuristic-Based Query Rewriting," IBM Canada Ltd., 2003, fifteen pages.
United States Office Action, U.S. Appl. No. 13/546,989, Nov. 19, 2012. 13 pages.
United States Office Action, U.S. Appl. No. 12/757,639, Aug. 29, 2011, 12 pages.
United States Office Action, U.S. Appl. No. 12/757,639, Dec. 30, 2011, 16 pages.
United States Advisory Action, U.S. Appl. No. 12/757,639, Feb. 8, 2012, 3 pages.
U.S. Appl. No. 12/122,579, filed May 16, 2008, Inventors Barry M. Zane et al.

\* cited by examiner

SYSTEM AND METHOD FOR PROCESSING DATABASE QUERIES

CROSS-REFERENCE TO RELATED APPLICATIONS

This application is a continuation of U.S. patent application Ser. No. 13/546,989, filed on Jul. 11, 2012, which is a continuation of U.S. patent application Ser. No. 12/757,639, filed on Apr. 9, 2010, now U.S. Pat. No. 8,244,715, which claims the benefit of U.S. Provisional Patent Application No. 61/168,197, filed Apr. 9, 2009, each of which is incorporated by reference in its entirety.

BACKGROUND

The invention relates to planning join orders for database queries implicating a relatively large number of tables.

User database queries have become increasingly complex (e.g., involving larger numbers of joins between tables) as database technology enables the management of larger and more comprehensive databases in fields such as warehouses and/or life sciences, for example. Query optimizers in existing database management systems suffer from intolerably long optimization time and/or poor optimization results when optimizing large join queries. This is at least in part because processing and storage costs associated with planning join orders for joining tables to execute a database query grow exponentially with the number of tables that must be joined.

SUMMARY

One aspect of the invention relates to processing queries to a database. In particular, the processing of queries to the database is enhanced by enhancing the determination of join orders of tables implicated in queries. Join orders between relatively large numbers of tables are determined by dividing the set of tables to be ordered into a plurality of subsets of tables, and ordering the individual subsets of tables.

The database queries processed may be received at a database server from a client processing platform. The queries may be input to the client processing platform by a user. The database server may be configured to provide database services to database clients implemented on client processing platforms. The database server may include one or more processors configured to execute one or more computer program modules to process the database queries received from the client processing platform(s).

The one or more computer program modules executed on the database server may include one or more of a query response module, a parameter module, a model module, a subset module, an intermediate join module, a final join module, and/or other modules. The one or more processors of the database server may be configured to execute the modules by software; hardware; firmware; some combination of software, hardware, and/or firmware; and/or other mechanisms for configuring processing capabilities on the processor.

The query response module may be configured to receive queries to the database (e.g., from the client processing platforms). A given query may implicate a set of tables in the database that must be joined to satisfy the given query.

The parameter module may be configured to obtain parameters related to one or more of a query received by the query response module, tables implicated in the received query, relationships between the tables implicated in the received query, types of joins between the tables implicated in the received query, key type information, uniqueness constraints defined in the schema, table and column statistics, estimated selectivity of local predicates on tables, estimated selectivity of join predicates, and/or other parameters. The parameters may include one or more parameters dictated by one or more configurable settings (as is discussed further below).

The model module may be configured to assemble one or more classification models for each query received by the database server. The classification models may represent the parameters of tables, and/or the relationships therebetween, in a set of tables that must be joined to satisfy a query received at query response module. The plurality of classification models may be stored (e.g., in electronic storage 14) as part of the query's context. The one or more classification models may include one or more of tree-like structure built for a query optimizer, a PK-FK graph, an undirected join graph, a directed results graph, and/or other models.

The classification models may be generated by iteratively adding information to a previously determined classification model and/or rearranging relationships between the tables depicted in a previous classification model. The information added to the previously determined classification model may include information (e.g., parameters) derived and/or inferred from the previously determined classification model. The rearrangement of relationships between the tables depicted in a previous classification model may be made based on information (e.g., parameters) derived and/or inferred from the previously determined classification model.

For example, a FK-PK graph may be a directed graph where nodes represent tables and an edge originates from the foreign key table and is incident on the table with the referenced primary key table. A join graph may use all equijoin predicates within a single query block, and may represent joins between base tables or derived tables, or any combination thereof. The join graph edges may be annotated with the join predicates such that an edge may represent all joins between a pair of tables. A directed results graph may be generated from a corresponding join graph. In addition to being directed, the nodes and/or edges of the results graph may be annotated with cumulative weights. These cumulative weights may be based on the selectivities of the local and join predicates. For instance, if a result graph has 4 nodes, u→v→w→x, the edge weight of the first edge u→v may be cumulative of node v and edges v→w and w→x.

The subset module may be configured to divide a set of tables implicated in a query to the database into a plurality of subsets of tables. An individual subset of queries may include one or more of the tables included in the set of tables. The subset module may divide the set of tables into the plurality of subsets of tables based on one or more of the classification model(s) generated by the model module, one or more parameters related to the tables obtained from the parameter module, one or more system parameters obtained from the parameter module, and/or other information and/or parameters.

The subsets of tables created by the subset module from a set of tables may include two or more subsets of tables that overlap. This means that, for example, two subsets of tables may include one or more tables that are common to both subsets of tables. However, neither of the subsets of tables is subsumed by the other (i.e., neither of the subsets consists entirely of tables included in the other). The overlapping of subsets may provide enhancements over implementations in which no subsets overlap (e.g., there are no tables common between a plurality of subsets). For example, subset groupings that permit overlapping may maintain a larger possible number of join order permutations for joining the subset join orders (as is discussed further below) over subset groupings that do not permit overlap.

A grouping of a set of tables implicated in a query into a plurality of subsets of tables may be provided from the subset module to the intermediate join module and/or the final join module for join ordering. One or both of the intermediate join module and/or the final join module may include a conventional query optimizer (e.g., Postgres optimizer and/or other conventional query optimizers). The intermediate join module may be configured to generate subset join orders that separately order joins of the tables in the individual subsets of tables. The subset join orders may be optimized as if the subset of tables was a discrete set of tables for its own query.

The intermediate join module may not generate the subset join orders until all (or substantially all) of the subsets of tables have been determined by the subset module. In such implementations, rather than optimizing the individual subset join order for only an associated subset of tables, the intermediate join module may consider parameters related to other inter-related subsets (and/or the tables included therein) when determining the subset join order for the subset. This may result in the generation of a subset join order for a given subset of tables that is not the most efficient join order for the tables in the given subset of tables considered separately from the rest of the tables in the set of tables. But the subset join order may instead enhance the efficiency of a final join order that orders the joins of all of the tables in the set (as discussed below).

The final join module may be configured to generate a final join order by ordering the subset join orders. The final join module may wait to order the subset join orders until all (or substantially all) of the subset join orders have been generated. This may facilitate an ordering of the subset join orders that takes into account the ordering of the tables in the individual subset join orders. In implementations where the subsets of tables include overlap (e.g., two or more subsets share one or more tables in common), the number of possible orderings of the subset join orders may be enhanced (as was mentioned above). Basing the ordering of the subset join orders on the ordering of tables in the individual subsets, and/or the definition of the subsets to include overlap may enable the final join module to generate a final join order that is more efficient than implementations in which subset join orders are merely plugged into a predetermined ordering all the subsets.

As was mentioned above, the subset join orders generated by the intermediate join module may not be "greedy" (i.e., optimized for the individual subsets of tables as discrete units). Instead, the individual subset join orders may be generated to enhance the efficiency of the final join order. To facilitate this, in some implementations, the groupings of subsets may be provided to the final join module prior to the generation of the subset join orders. The final join module may generate a preliminary ordering of some or all of the subsets without the tables in the individual subsets being ordered first by the intermediate join module. These preliminary orderings of subsets may be provided to the intermediate join module so that the intermediate join module can generate subset join orders that have an enhanced efficiency within the context of the preliminary orderings.

As the intermediate join module generates the subset join orders that are based on a preliminary ordering of two or more of the subsets, the processor (e.g., the final join module and/or the intermediate join module) may determine an estimated cost (e.g., a processing cost, a storage cost, I/O cost, and/or other costs) of the join order of the tables included in the subsets of tables that are ordered by the preliminary ordering. The estimated cost may be determined by aggregating the cost of the individual subset join orders for the subsets ordered by the preliminary ordering.

If the estimated cost of a preliminary ordering of subsets breaches a threshold, then the preliminary ordering of these subsets of tables by the final module may be abandoned, and a new preliminary ordering including some or all of the previously ordered subsets (and/or other subsets from the set of tables) may be generated by the final join module. The intermediate join module may then begin to generate another round of subset join orders that are intended to enhance the efficiency of this new preliminary ordering. This process may be repeated until a final join order has been assembled by the final join module and the intermediate join model by linking all of the subsets of tables.

If the cost of a preliminary ordering of at least some of the subsets is generated that satisfies the threshold cost requirement, the final join module may generate another preliminary ordering including some of the subsets of tables. The new preliminary ordering may include one or more of the previously ordered subsets (e.g., by the preliminary ordering that satisfies the cost threshold). This would link the previously ordered subsets with other subsets from the set of tables. Or, the new preliminary ordering may be determined entirely for subsets that have not previously been ordered. In this manner, the final join module and intermediate join module may iteratively (and recursively) step through the subsets of tables to generate a final join order that orders all of the tables in the set of tables.

Upon generation of the final join order that orders all of the tables implicated in a query of the database, the processor of the database server may generate an execution plan from the final join order. The processor may then execute the query according to the execution plan based on the final join order.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
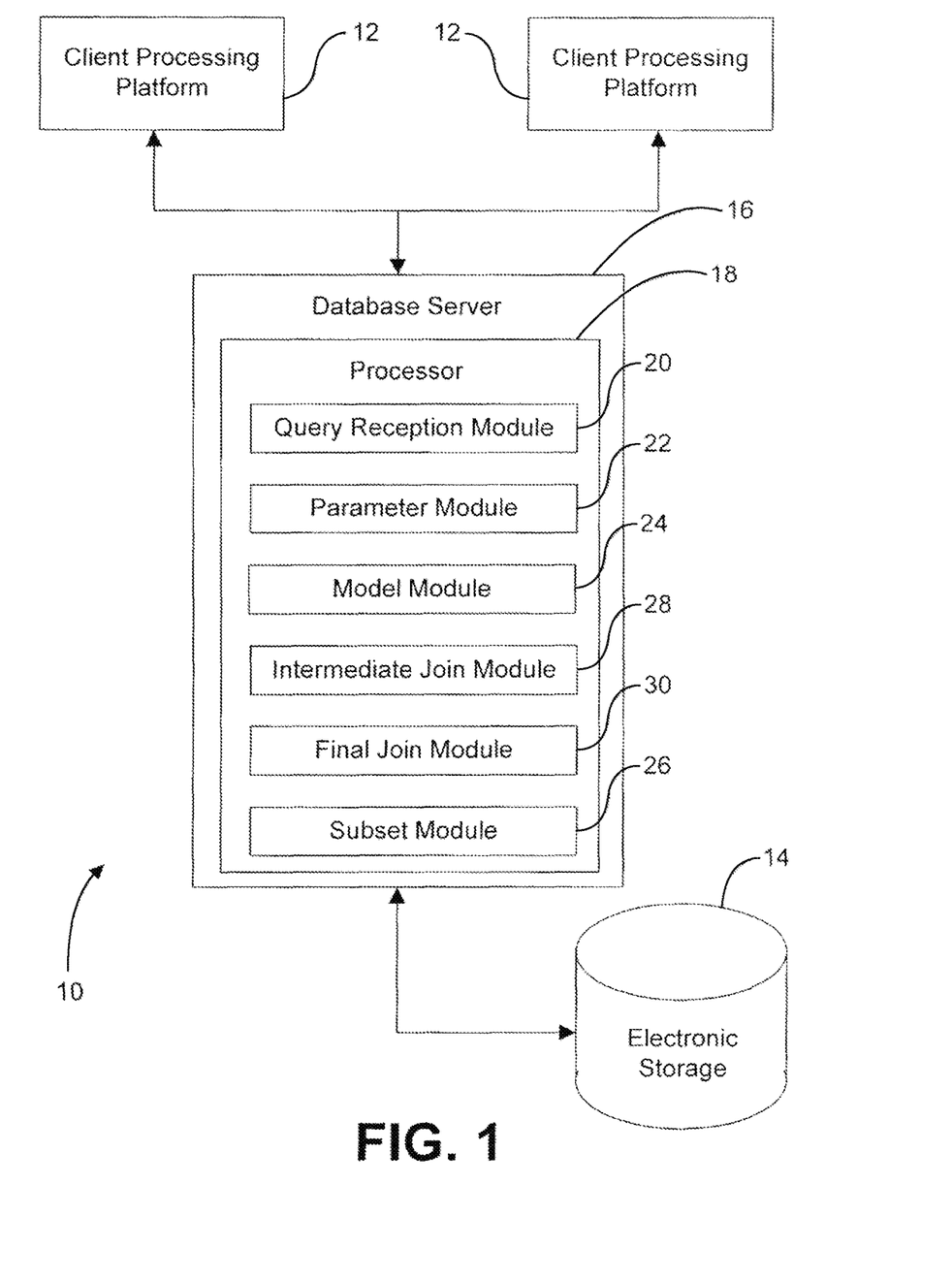
FIG. 1 illustrates a system configured to process queries to a database, in accordance with one or more embodiments of the invention.

FIG. 1 illustrates a system 10 configured to process queries to a database. In particular, the system is configured to process queries to the database by determining execution plans for executing queries to the database. System 10 may be configured to determine optimized join orders of tables implicated in queries as part of determining execution plans for executing the queries. The optimized join orders can be determined for relatively large numbers of tables and/or the optimization results may be enhanced for joins with relatively large numbers of tables. The system may include one or more of one or more client processing platforms 12, electronic storage 14, a database server 16, and/or other components.

It should be appreciated that as used herein, the terms "optimize" and/or "optimizer" do not necessarily refer to the refinement of a query and/or join order to a "best" or "optimal" join order solution. Instead, the term is used consistent with its meaning in the field of database management to describe the process of searching for efficient query plans (including join orders) that will satisfy received queries. While the process of optimization may include generation of a join order solution for use in executing a given query, the join order solution may not be the optimal solution where the optimal solution is not examined due the use of heuristics in the generation of the join order solution that omit the optimal solution from consideration.

The client processing platforms 12 may include one or more computer platforms capable of executing one or more computer program modules that cooperate to implement database clients on the client processing platforms 12. The database clients may provide access for one or more users to the database managed by system 10. This may include enabling users to search information in the database, enabling users to request (and receive) specific information in the database, writing and/or editing information within the database, and/or other forms of access to the information stored in the database. As such, the database clients may include user interfaces (e.g., graphical user interfaces, command line interfaces, and/or other interfaces), communication functionality for communicating (e.g., requests for information, queries, information from the database, and/or other communications) with database server 16. The client processing platforms 12 may include one or more of a desktop computer, a laptop computer, a handheld computer, a netbook, a mobile voice communication device (e.g., a smart phone), a personal digital assistant, and/or other processing platforms.

Electronic storage 14 may include one or more electronic storage media that electronically store information. The electronic storage media of electronic storage 14 may include one or both of system storage that is provided integrally (i.e., substantially non-removable) with system 10 and/or removable storage that is removably connectable to system 10 via, for example, a port (e.g., a USB port, a firewire port, and/or other media) or a drive (e.g., a disk drive, and/or other media). Electronic storage 14 may include one or more of optically readable storage media (e.g., optical disks, and/or other media), magnetically readable storage media (e.g., magnetic tape, magnetic hard drive, floppy drive, etc.), electrical charge-based storage media (e.g., EEPROM, RAM, and/or other media), solid-state storage media (e.g., flash drive), and/or other electronically readable storage media. Electronic storage 14 may store software algorithms, information determined by processor database server 16, information received via from users via client processing platforms 12, the database managed by system 10, and/or other information that enables system 10 to function properly. Electronic storage 14 may include one or more separate components within system 10, or electronic storage 20 may include one or more storage media provided integrally with one or more other components of system 10 (e.g., database server 16).

The illustration of electronic storage 14 in FIG. 1 as a single entity is not intended to be limiting. In modern database storage and/or management, storage may be distributed between a plurality of separate devices and/or systems. Such cooperating storage devices and/or systems may be co-located, or may be located remotely from each other and linked operatively for communication therebetween (e.g., over a network). For example, U.S. patent application Ser. No. 12/122,579, entitled "Storage Performance Optimization," and filed May 16, 2008 (the "'579 Application"), describes a distributed database system implementing a plurality of different storage hardware to provide the functionality attributed herein to database server 16. The '579 Application is incorporated by reference into this disclosure in its entirety.

Database server 16 is configured to provide database services to the database clients implemented on client processing platforms 12. As such, database server 16 may be configured to provide some or all of the database management functionality of system 10. As was the case with electronic storage 14, the illustration in FIG. 1 of database server 16 as a single entity is not intended to be limiting. The scope of this disclosure includes implementations in which the functionality attributed herein to database server 16 is provided by a plurality of separate processing platforms. At least some of these processing platforms may be physically co-located and/or at least some of the processing platforms operating as database server 16 may be located remotely from each other and linked operatively for communication therebetween (e.g., over a network). By way of non-limiting example, the '579 Application describes a plurality of distributed devices that cooperate to provide database server functions.

It will be appreciated that the description herein of system 10 as including a client/server architecture is not intended to be limiting. The scope of this disclosure includes systems in which the functionality attributed to one or more of client processing platforms 12 and database server 16 may be provided by a single device or entity that provides access for users to the database. Other architectures are also anticipated.

As can be seen in FIG. 1, database server 16 may include a processor 18. Processor 18 is configured to provide information processing capabilities for database server 16. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor may include a plurality of processing units. These processing units may be physically located within the same device, or if database server 16 includes a plurality of distributed devices, processor 18 may represent processing functionality of these devices operating in coordination.

As is shown in FIG. 1, processor 18 may be configured to execute one or more computer program modules. The one or more computer program modules may include one or more of a query response module 20, a parameter module 22, a model module 24, a subset module 26, an intermediate join module 28, a final join module 30, and/or other modules. Processor 16 may be configured to execute modules 20, 22, 24, 26, 28, and/or 30 by software; hardware; firmware; some combination of software, hardware, and/or firmware; and/or other mechanisms for configuring processing capabilities on processor 18.

It should be appreciated that although modules 20, 22, 24, 26, 28, and/or 30 are illustrated in FIG. 1 as being co-located within a single processing unit, in implementations in which processor 18 includes multiple processing units, one or more of modules 20, 22, 24, 26, 28, and/or 30 may be located remotely from the other modules. The description of the functionality provided by the different modules 20, 22, 24, 26, 28, and/or 30 described below is for illustrative purposes, and is not intended to be limiting, as any of modules 20, 22, 24, 26, 28, and/or 30 may provide more or less functionality than is described. For example, one or more of modules 20, 22, 24, 26, 28, and/or 30 may be eliminated, and some or all of its functionality may be provided by other ones of modules 20, 22, 24, 26, 28, and/or 30. As another example, processor 18 may be configured to execute one or more additional modules that may perform some or all of the functionality attributed below to one of modules 20, 22, 24, 26, 28, and/or 30.

In order to provide full database management capabilities within system 10, processor 18 may execute other modules that provide functionality to database server 16 that is additional to functionality of the modules depicted in FIG. 1 (e.g., modules 20, 22, 24, 26, 28, and/or 30). The modules shown in FIG. 1 and described below may be associated with the query processing functionality associated with the optimization of join orders. The exclusion from this disclosure of descriptions of modules executed by processor 18 to enable database server 16 to provide other database services to client processing platform 12 is for brevity, and does not mean that such functionality is not to be provided by database server 16.

The query response module 20 may be configured to receive a query of the database managed by system 10. The query may be received from one or more client processing platforms 12. The query may be input to client processing platforms 12 by a user. The query may implicate a set of tables in the database that must be joined to satisfy the query.

The parameter module 22 may be configured to obtain parameters (e.g., statistics, meta-information, and/or other parameters) related to one or more of a query received by query response module 20, tables implicated in the received query, relationships between the tables implicated in the received query, types of joins between the tables implicated in the received query, key type information, uniqueness constraints defined in the schema, table and column statistics, estimated selectivity of local predicates on tables, estimated selectivity of join predicates, and/or other parameters. The parameters may include one or more parameters dictated by one or more user configurable settings (as is discussed further below). Obtaining the parameters may include accessing previously stored parameters, receiving parameters input by users (e.g., via client processing platforms 12), determining parameters, and/or otherwise obtaining parameters.

The model module 24 may be configured to assemble one or more classification models that represents the parameters of tables in a set of tables that must be joined to satisfy a query received at query response module 20. The model module 24 may include a query parser that takes the query input by a user and builds a classification model that is a tree-like structure depicting the relationships between the tables implicated in the received query, and/or the structure of the query. The model module 24 may obtain parameters of the relationships between the tables implicated in the query from parameter module 22.

If model module 24 includes a parser, the tree-like structure generated by the parser may be a query that readable by an existing optimizer, such as Postgres optimizer and/or other existing optimizers. In some implementations, the tree-like structure initially generated by model module 24 may be different from queries for existing optimizers such as Postgres optimizer.

The model module 24 may generate a plurality of classification models for a single query. The plurality of classification models may be stored (e.g., in electronic storage 14) as part of the query's context. The classification models may be generated iteratively by adding information to a previously determined classification model and/or rearranging relationships between the tables depicted in a previous classification model. The information added to the previously determined classification model may include information (e.g., parameters) derived and/or inferred from the previously determined classification model. The rearrangement of relationships between the tables depicted in a previous classification model may be made based on information (e.g., parameters) derived and/or inferred from the previously determined classification model.

For example, model module 24 may generate a FK-PK graph depicting the relationships between the set of tables implicated in a received query. The FK-PK graph may be generated based on a tree-like structure preliminarily representing the received query (e.g., generated by the parser of model module 24). The FK-PK graph may be a directed graph where nodes represent tables and an edge originates from the foreign key table and is incident on the table with the referenced primary key table. The definition of the key type of tables and/or columns therein may be obtained by model module 24 from parameter module 22. If no foreign keys are defined for any of the tables, model module 24 may attempt to infer such definitions (e.g., from related parameters obtained from parameter module 22). In some instances, no foreign keys may be defined because of the absence of a star schema. It will be appreciated that the processing of queries described herein are not limited to star schema. If no foreign keys are defined, and none can be inferred, then the FK-PK graph may be empty.

The classification models generated by model module 24 may include a join graph. The join graph may be undirected. The join graph may use all equijoin predicates within a single query block, and may represent joins between base tables or derived tables, or any combination thereof. The join graph edges may be annotated with the join predicates such that an edge may represent all joins between a pair of tables.

The classification models generated by model module 24 may include a directed results graph. The directed results graph may be based on the join graph. In order to determine the directed results graph from the undirected join graph, model module 24 may classify the edges in the join graph. The edges may be classified, for example, as a pure FK-PK join, a One-to-One join (e.g., on unique columns), a Many-to-One join, a Many-to-Many join, and/or other join classifications. The edges may be classified by model module 24 based on parameters obtained from parameter module 22, from parameters determined by one or more previously generated classification models (e.g., the join graph, the PK-FK graph, and/or other classification models), and/or other parameters. For example, the one or more parameters used to classify the edges of the join graph by model module 24 may include one or more of the key type information included in the PK-FK graph (if one has been built), uniqueness constraints defined in the schema (e.g., obtained from parameter module 22), table and column statistics (e.g., obtained from parameter module 22), estimated selectivity of local predicates on tables (e.g., obtained from parameter module 22), estimated selectivity of join predicates (e.g., obtained from parameter module 22), and/or other parameters.

Once the edges of the join graph have been classified by model module 24, and the directed results graph has been generated therefrom, model module 24 may annotate the nodes and/or edges of the results graph with cumulative weights. These cumulative weights may be based on the selectivities of the local and join predicates. For instance, if a result graph has 4 nodes, u→v→w→x, the edge weight of the first edge u→v may be cumulative of node v and edges v→w and w→x.

The subset module 26 may be configured to divide a set of tables implicated in a query to the database received by query response module 20 into a plurality of subsets of tables. An individual subset of queries may include one or more of the tables included in the set of tables. The subset module 26 may divide the set of tables into the plurality of subsets of tables based on one or more of the classification model(s) generated by model module 24, one or more parameters related to the tables obtained from parameter module 22, one or more system parameters obtained from parameter module 22, and/or other information and/or parameters.

For example, the system parameters obtained from parameter module 22 by subset module 26 for use in dividing the set of tables into subsets of tables may include a constraint on the number of tables that can be included in a subset of tables. The constraint may include a maximum and/or a minimum number of tables. The constraint may be an absolute number (e.g., 3 tables), or relative to the total number of tables in the set of tables implicated in the query (e.g., a % or fraction of the total number). The constraint may be configurable by a user and/or a system administrator. The system parameters obtained from parameter module 22 by subset module 26 for use in dividing the set of tables into subsets of tables may include a constraint on the number of subsets of tables. The constraint on the number of subsets of tables may include a maximum and/or a minimum number of subsets. The constraint on the number of subsets of tables may be configurable by a user and/or a system administrator.

The one or more parameters obtained from parameter module 22 by subset module 26 to divide the set of tables into subsets of tables may include parameters relevant to the "cost" (e.g., processing cost, storage cost, and/or other system costs) of joining the tables. By way of non-limiting example, the parameters may include one or more of parameter(s) related to the selectivity of predicates, parameter(s) related to the synchronicity between tables, parameter(s) related to the structure of the received query, parameter(s) related to the physical storage location of the information in the tables, parameter(s) related to the distribution of information in the tables, parameter(s) related to the size and/or speed of the memory used to store information generated during optimization by system 10, and/or other parameters. One or more of these parameters may be included in (and/or represented by) the classification model(s) generated by model module 24. For example, the selectively of predicates may be represented by the information annotated to edges and/or nodes in a directed results graph generated by model module 24 (e.g., as discussed above).

In order to divide the set of tables into subsets of tables, subset module 26 may perform a weighted depth-first traversal of a results graph generated by model module 24. The traversal of the results graph by subset module 26 may give priority to including nodes connected by edges annotated with lower weights in the same subset over including nodes connected by edges annotated with higher weights in the same subset. Lower weight edges may be given priority because a lower weight may connote a smaller cardinality of intermediate results.

Figure 2:
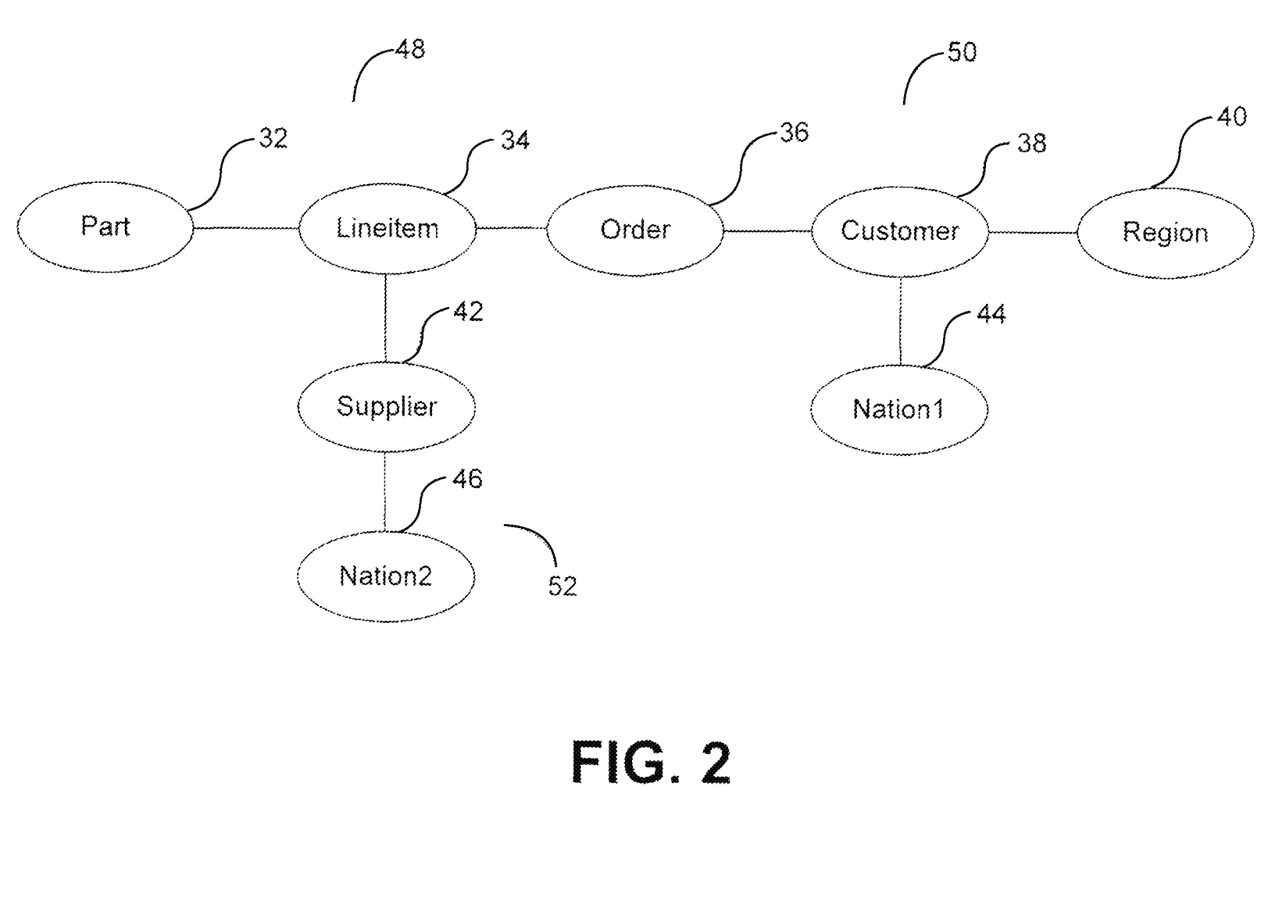
FIG. 2 illustrates a set of tables implicated in a query to a database, according to one or more embodiments of the invention.

By way of illustration, FIG. 2 illustrates a graph depicting a plurality of tables 32, 34, 36, 38, 40, 42, 44, and 46 implicated in a database query. The tables 32, 34, 36, 38, 40, 42, 44, and 46 have been divided into a plurality of subsets 48, 50, and 52. As can be seen in FIG. 2, subsets 48, 50, and 52 may include tables in common. For example, tables 34 and 42 are common to both subset 48 and subset 52. However, neither subset 48 nor subset 52 is merely a sub-grouping of the tables in the other. Instead each of subsets 48 and subset 52 include at least one table that is not common to the other (e.g., tables 32 and 36 are in subset 48 but not subset 52, and table 46 is in subset 52 but not subset 48). Similarly, table 36 is included in subset 48 and subset 50, and neither subset 48 nor subset 50 is merely a sub-grouping of the tables in the other.

The overlapping of subsets, such as the overlapping between subsets 48 and 50 and between subsets 48 and 52, shown in FIG. 2 may provide enhancements over implementations in which no subsets overlap (e.g., there are no tables common between a plurality of subsets). For example, subset groupings that permit overlapping may maintain a larger possible number of join order permutations (as is discussed further below) over subset groupings that do not permit overlap.

Referring back to FIG. 1, a grouping of a set of tables implicated in a query into a plurality of subsets of tables may be provided within processor 18 from subset module 26 to intermediate join module 28 and/or final join module 30 for join ordering. One or both of intermediate join module 28 and/or final join module 30 may include a conventional query optimizer (e.g., Postgres optimizer and/or other conventional query optimizers). The intermediate join module 28 may be configured to generate subset join orders that separately order joins of the tables in the individual subsets of tables. The subset join orders may be optimized as if the subset of tables was a discrete set of tables for its own query. In such implementations, intermediate join module 28 may include a conventional query optimizer (e.g., Postgres and/or other conventional query optimizers).

The intermediate join module 28 may not generate the subset join orders until all (or substantially all) of the subsets of tables have been determined by subset module 26. In such implementations, rather than optimizing the individual subset join order for only an associated subset of tables, intermediate join module 28 may consider parameters related to other inter-related subsets (and/or the tables included therein) when determining the subset join order for the subset. This may result in the generation of a subset join order for a given subset of tables that is not the most efficient join order for the tables in the given subset of tables considered separately from the rest of the tables in the set of tables. Instead the subset join order may enhance the efficiency of a final join order that orders the joins of all of the tables in the set (as discussed below).

The final join module 30 may be configured to generate a final join order by ordering the subset join orders. Final join module 30 may wait to order the subset join orders until all (or substantially all) of the subset join orders have been generated. This may facilitate an ordering of the subset join orders that takes into account the ordering of the tables in the individual subset join orders. In implementations where the subsets of tables include overlap (e.g., two or more subsets share one or more tables in common), the number of possible orderings of the subset join orders may be enhanced (as was mentioned above). Basing the ordering of the subset join orders on the ordering of tables in the individual subsets, and/or the definition of the subsets to include overlap may enable final join module 30 to generate a final join order that is more efficient than implementations in which subset join orders are merely plugged into a predetermined ordering.

As was mentioned above, the subset join orders generated by intermediate join module 28 may not be "greedy" (i.e., optimized for the individual subsets of tables as discrete units). Instead, the individual subset join orders may be generated to enhance the efficiency of the final join order. To facilitate this, in some implementations, the groupings of subsets may be provided to final join module 30 prior to the generation of the subset join orders. The final join module 30 may generate a preliminary ordering of some or all of the subsets without the tables in the individual subsets being ordered first by intermediate join module 28. These preliminary orderings of subsets may be provided to intermediate join module 28 so that the intermediate join module can generate subset join orders that have an enhanced efficiency within the context of the preliminary orderings.

As intermediate join module 28 generates the subset join orders that are based on a preliminary ordering of two or more of the subsets, the processor (e.g., the final join module and/or the intermediate join module) may determine an estimated cost (e.g., a processing cost, a storage cost, I/O cost, and/or other costs) of the join order of the tables included in the subsets of tables that are ordered by the preliminary ordering. The estimated cost may be determined by aggregating the cost of the individual subset join orders for the subsets ordered by the preliminary ordering.

If the estimated cost of a preliminary ordering of subsets breaches a threshold, then the preliminary ordering of these subsets of tables by the final module may be abandoned, and a new preliminary ordering including some or all of the previously ordered subsets (and/or other subsets from the set of tables) may be generated by the final join module. The intermediate join module 28 may then begin to generate another round of subset join orders that are intended to enhance the efficiency of this new preliminary ordering. This process may be repeated until a final join order has been assembled by final join module 30 and intermediate join model 28 by linking all of the subsets of tables. It will be appreciated that the cost threshold used to determine if a preliminary ordering provides a sufficiently optimized order for joining the tables may be a dynamic threshold determined by final join module 30 and/or intermediate join module 28 based on one or more factors. The one or more factors may include, for example, the cost associated with previously ordered subsets and/or tables, one or more system capabilities and/or features (e.g., storage size and/or speed, I/O rates, processing resources, etc.).

If the cost of a preliminary ordering of at least some of the subsets is generated that satisfies the threshold cost requirement, final join module 30 may generate another preliminary ordering including some of the subsets of tables. The new preliminary ordering may include one or more of the previously ordered subsets (e.g., by the preliminary ordering that satisfies the cost threshold). This would link the previously ordered subsets with other subsets from the set of tables. Or, the new preliminary ordering may be determined entirely for subsets that have not previously been ordered. In this manner, final join module 30 and intermediate join module 28 may iteratively (and recursively) step through the subsets of tables to generate a final join order that orders all of the tables in the set of tables.

Upon generation of a final join order (e.g., the final join order with the lowest estimated cost) that orders all of the tables implicated in a query of the database managed by system 10, processor 18 may generate an execution plan from the final join order. The processor 18 may then execute the query according to the execution plan based on the final join order.

Figure 3:
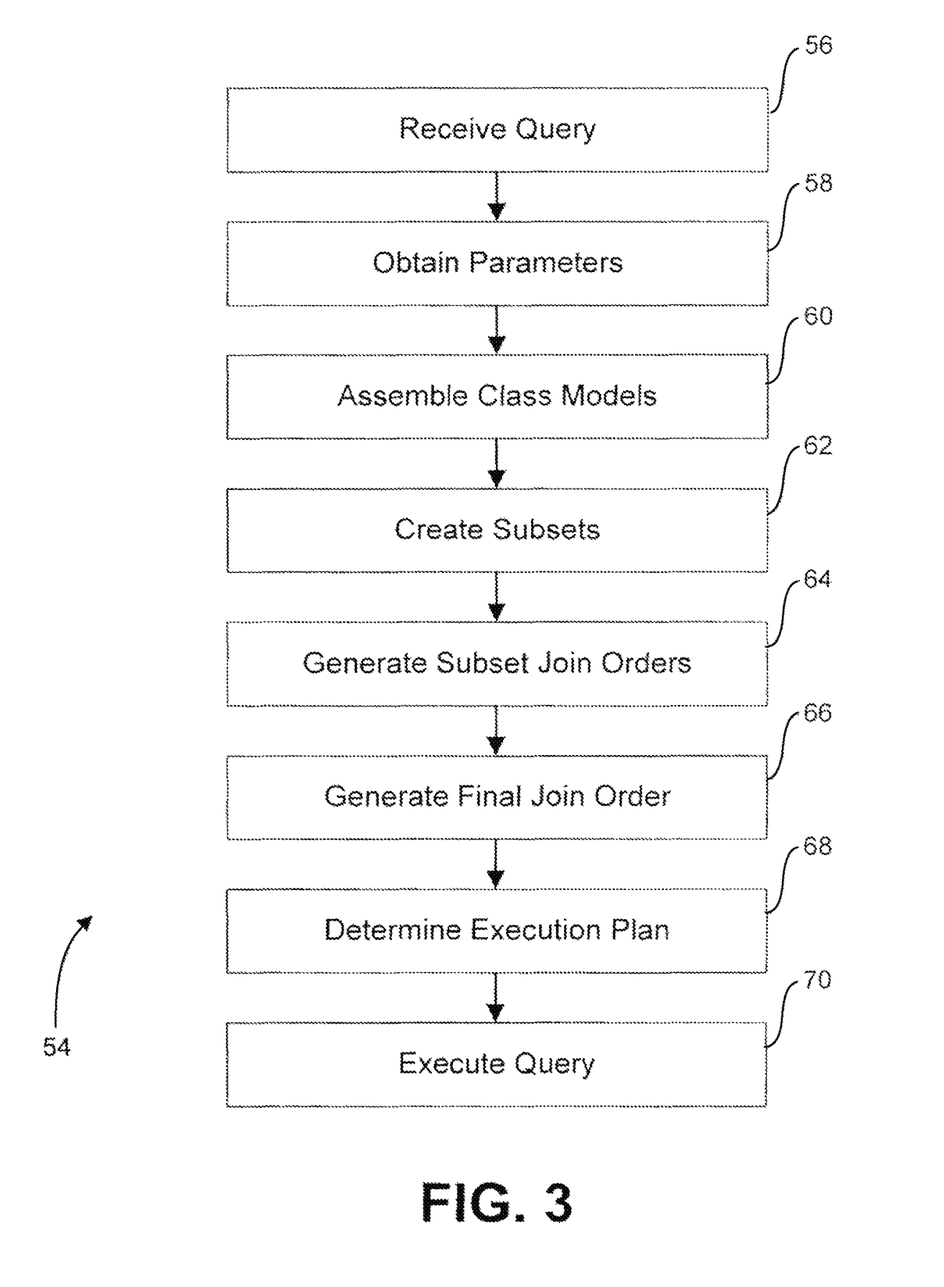
FIG. 3 illustrates a method of processing queries to a database, in accordance with one or more embodiments of the invention.

FIG. 3 illustrates a method 54 of processing queries to a database. The operations of method 54 presented below are intended to be illustrative. In some embodiments, method 54 may be accomplished with one or more additional operations not described, and/or without one or more of the operations discussed. Additionally, the order in which the operations of method 54 are illustrated in FIG. 3 and described below is not intended to be limiting.

For illustrative purposes, the operations of method 54 are described below with respect to the components of system 10 (illustrated in FIG. 1 and described above). It will be appreciated that this description is not intended to be limiting, and that the operations of method 54 may be implemented in a variety of different contexts other than the one described above.

At an operation 56, a database query is received. The query may be received from a client processing platform. The client processing platform may be the same as or similar to client processing platform 12 (illustrated in FIG. 1 and described above). The query may be received at a database server. The database server may be the same as or similar to database server 16 (illustrated in FIG. 1 and described above). The query may implicate a set of tables associated with the database that must be joined to satisfy the query.

At an operation 58, one or more parameters related to the query, the tables in the set of tables implicated in the query, the system processing the database query, and/or other parameters may be obtained. The one or more parameter may be obtained by implementing a parameter module that is executed by the database server. The parameter module may be the same as or similar to parameter module 22 (illustrated in FIG. 1 and described above).

At an operation 60, one or more classification models may be assembled. The one or more classification models may represent relationships between the tables in the set of tables that must be joined to satisfy the query. The relationships between the tables may include edges between the table nodes. The one or more classification models may include one or more of a tree-structure representing the query, a PK-FK graph, an undirected join graph, a directed results graph, and/or other classification models. Operation 60 may be executed by a model module that is the same as or similar to model module 24 (illustrated in FIG. 1 and described above).

At an operation 62, the set of tables implicated by the query may be divided into a plurality of subsets of tables. A subset of tables may include one or more tables from the set of tables. The division of the set of tables into a plurality of subsets of tables may be based on one or more of the classification model(s) assembled at operation 60 and/or the parameters obtained at operation 58. Operation 62 may be executed by a subset module that is the same as or similar to subset module 26 (illustrated in FIG. 1 and described above).

At an operation 64, subset join orders for the subsets of tables created at operation 62 are generated. The subset join orders separately order the tables within the individual subsets of tables. The subset join order for a given subset of tables may be based on information related to tables in the set of tables that are not included in the given subset of tables (e.g., based on a preliminary ordering of the subsets of tables as described above). Operation 64 may be executed by an intermediate join module that is the same as or similar to intermediate join module 28 (illustrated in FIG. 1 and described above).

At an operation 66, a final join order for the tables in the set of tables is generated. The final join order may be generated by ordering the subset join orders. The ordering of the subset join orders in the final join order may be based on the order of the tables in the individual subset join orders. The generation of a final join order may include comparing the cost associated with a plurality of possible final join orders (e.g., as described above). Operation 66 may be executed by a final join module that is the same as or similar to final join module 30 (illustrated in FIG. 1 and described above).

At an operation 68, an execution plan may be generated for the received query. The execution plan may be based on the final join order. Operation 68 may be performed by a database server that is the same as or similar to database server 16 (illustrated in FIG. 1 and described above).

At an operation 70, the query may be executed according to the execution plan. Operation 70 may be performed by the database server, and served to the client processing platform.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for processing database queries, the method comprising:
   receiving, by a database system storing a set of tables, a database query specifying a join of the set of tables;
   dividing the set of tables into a plurality of subsets of tables, the dividing comprising:
      representing the set of tables as a graph including nodes and edges, the nodes corresponding to the tables and the edges corresponding to the relationships between the tables,
      assigning weights to the edges, a weight of an edge determined based on parameters describing a set of relationships between tables corresponding to the edge, and
      performing a weighted depth first traversal of the graph to combine the tables into the plurality of subsets of tables;
   for each of the plurality of subsets of tables, determining subset join order for the tables within the subset of tables;
   responsive to determining the subset join order for each of the plurality of tables, determining a final join order for all the tables of the set of tables by ordering the subset join orders; and
   generating an execution plan for the database query responsive to determining the final join order.

2. The method of claim 1, further comprising:
   receiving parameters of the tables of the set of tables, wherein the final join order is based on the parameters of the tables.

3. The method of claim 2, wherein the parameters of the tables are associated with a cost of joining the tables.

4. The method of claim 1, further comprising receiving a constraint on sizes of the subsets of tables, wherein the division of the set of tables in the subsets of tables is constrained by the constraint.

5. The method of claim 1, wherein the subset join order of each subset of tables is determined using a non-greedy strategy.

6. The method of claim 1, wherein determining the final join order comprises:
   determining a preliminary ordering of the subsets of tables; and
   iteratively refining the preliminary ordering of the subsets of tables prior to generating the execution plan using the subsets of tables.

7. The method of claim 1, further comprising receiving a constraint specifying a maximum or minimum number of the subsets of tables.

8. The method of claim 1, wherein a subset of tables is associated with a first subset join order and a second subset join order, wherein the first subset join order results in a first final join order for the set of tables and the second subset join order results in a second final join order for the set of tables, the method further comprising:
   selecting the first subset join order over the second subset join order in spite of the first subset join order having a less efficient plan compared to the second subset join order considered in isolation if the first final join order results in a more efficient query plan for the set of tables compared to the second final join order.

9. The method of claim 1, wherein the subset join order for a first subset of tables is determined based on parameters of a second subset of tables.

10. The method of claim 1, wherein determining a subset join order for a subset of tables comprises invoking a query optimizer for the subset of tables independent of the remaining subsets of tables.

11. The method of claim 1, wherein the parameters comprise a parameter related to selectivity of a predicate of a join relationship of the database query.

12. The method of claim 1, wherein the parameters comprise a parameter related to physical storage location of information in the tables joined by the database query.

13. The method of claim 1, wherein the parameters comprise a parameter related to one or more of size or speed of a memory used to store information generated during optimization.

14. A non-transitory computer readable storage medium storing instructions for:
   receiving, by a database system storing a set of tables, a database query specifying a join of the set of tables;
   dividing the set of tables into a plurality of subsets of tables, the dividing comprising:
      representing the set of tables as a graph including nodes and edges, the nodes corresponding to the tables and the edges corresponding to the relationships between the tables, assigning weights to the edges, a weight of an edge determined based on parameters describing a set of relationships between tables corresponding to the edge, and performing a weighted depth first traversal of the graph to combine the tables into the plurality of subsets of tables;

for each of the plurality of subsets of tables, determining subset join order for the tables within the subset of tables;

responsive to determining the subset join order for each of the plurality of tables, determining a final join order for all the tables of the set of tables by ordering the subset join orders; and generating an execution plan for the database query responsive to determining the final join order.

15. The non-transitory computer readable storage medium claim 14, further storing instructions for:

receiving parameters of the tables of the set of tables, wherein the final join order is based on the parameters of the tables.

16. The non-transitory computer readable storage medium claim 15, wherein the parameters of the tables are associated with a cost of joining the tables.

17. The non-transitory computer readable storage medium claim 14, further comprising receiving a constraint on sizes of the subsets of tables, wherein the division of the set of tables in the subsets of tables is constrained by the constraint.

18. The non-transitory computer readable storage medium claim 14, wherein determining the final join order comprises:

determining a preliminary ordering of the subsets of tables; and iteratively refining the preliminary ordering of the subsets of tables prior to generating the execution plan using the subsets of tables.

19. The non-transitory computer readable storage medium claim 14, further storing instructions for receiving a constraint specifying a maximum or minimum number of the subsets of tables.

20. The non-transitory computer readable storage medium claim 14, wherein the subset join order for a first subset of tables is determined based on parameters of a second subset of tables.

21. The non-transitory computer readable storage medium claim 14, wherein determining a subset join order for a subset of tables comprises invoking a query optimizer for the subset of tables independent of the remaining subsets of tables.

22. The non-transitory computer readable storage medium claim 14, wherein the parameters comprise one or more of:

a parameter related to selectivity of a predicate of a join relationship of the database query;

a parameter related to physical storage location of information in the tables joined by the database query; or a parameter related to one or more of size or speed of a memory used to store information generated during optimization.

23. A computer-implemented system for processing database queries, the system comprising:

a computer processor; and a non-transitory computer-readable storage medium storing instructions for:

receiving, by a database system storing a set of tables, a database query specifying a join of the set of tables;

dividing the set of tables into a plurality of subsets of tables, the dividing comprising:

representing the set of tables as a graph including nodes and edges, the nodes corresponding to the tables and the edges corresponding to the relationships between the tables, assigning weights to the edges, a weight of an edge determined based on parameters describing a set of relationships between tables corresponding to the edge, and performing a weighted depth first traversal of the graph to combine the tables into the plurality of subsets of tables;

for each of the plurality of subsets of tables, determining subset join order for the tables within the subset of tables;

responsive to determining the subset join order for each of the plurality of tables, determining a final join order for all the tables of the set of tables by ordering the subset join orders; and generating an execution plan for the database query responsive to determining the final join order.

24. The computer-implemented system of claim 23, wherein determining the final join order comprises:

determining a preliminary ordering of the subsets of tables; and iteratively refining the preliminary ordering of the subsets of tables prior to generating the execution plan using the subsets of tables.

25. The computer-implemented system of claim 23, wherein the non-transitory computer-readable storage medium further store instructions for:

receiving parameters of the tables of the set of tables, wherein the final join order is based on the parameters of the tables.

26. The computer-implemented system of claim 23, wherein the non-transitory computer-readable storage medium further store instructions for:

receiving a constraint on sizes of the subsets of tables, wherein the division of the set of tables in the subsets of tables is constrained by the constraint.

* * * * *

UNITED STATES PATENT AND TRADEMARK OFFICE
CERTIFICATE OF CORRECTION

PATENT NO. : 9,767,150 B2  
APPLICATION NO. : 13/947086  
DATED : September 19, 2017  
INVENTOR(S) : Cole et al.

Page 1 of 1

It is certified that error appears in the above-identified patent and that said Letters Patent is hereby corrected as shown below:

On the Title Page

In the Assignee Item (73), delete "Cupertino, CA" and insert --Palo Alto, CA--.

Signed and Sealed this  
Twelfth Day of June, 2018

Andrei Iancu  
*Director of the United States Patent and Trademark Office*